Oct. 21, 1941.  W. E. FIREHAMMER  2,259,973
FURNACE CONTROL
Filed Oct. 9, 1939  2 Sheets-Sheet 2

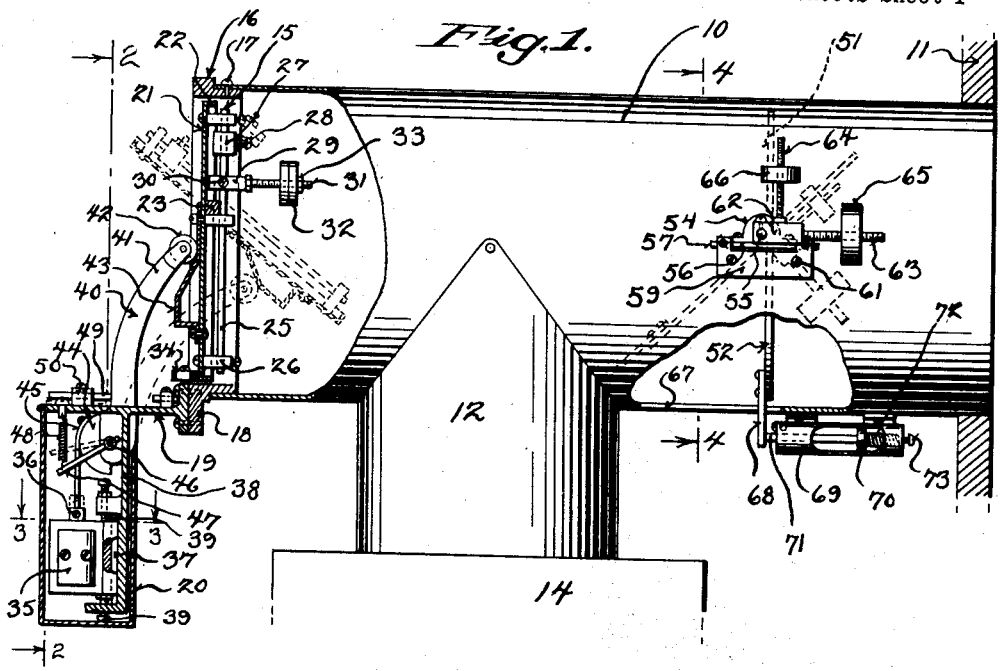

Inventor
W. E. Firehammer
By
Attorneys

Patented Oct. 21, 1941

2,259,973

UNITED STATES PATENT OFFICE 2,259,973

FURNACE CONTROL

Welton E. Firehammer, Oshkosh, Wis.

Application October 9, 1939, Serial No. 298,679

2 Claims. (Cl. 126—285)

This invention appertains to furnace controls, and is an improvement over my application for Control devices for heating systems, Serial No. 203,092, filed April 20, 1938, and matured into Patent No. 2,179,120, dated November 7, 1939.

One of the primary objects of my present invention is to provide means whereby the solenoid-actuated operating lever for the swinging damper gate is free of the damper gate, except by contact, thereby allowing the damper gate to be under the direct influence of the chimney temperatures or any atmospheric pressures when the said operating lever is drawn back by virtue of the operation of the solenoid magnet plunger attached to the lever.

Another salient object of my invention is to provide an operating lever having an anti-friction roller for rolling contact with an inclined track carried by and mounted upon the outer face of the damper gate to permit the damper gate to open to a greater degree with a progressively accelerated motion without changing the length of the lever travel.

Another important object of my invention is to provide a novel fixture for supporting and locating the adjustable damper gate weights, whereby the weights are independent of one another and adjustable for any desired draft value, the operation of the weights permitting the damper gate to become progressively lighter in weight as it opens in its maximum open range, thereby accommodating the power input of the solenoid to the point where less spring tension is required to complete the operation cycle.

A still further object of my invention is the provision of a novel design and method of controlling the cross-sectional area of any smoke-pipe or breaching with the use of an atmospherically controlled internal damper gate in direct combination with an externally mounted motorized, atmospherically operated damper gate.

A still further important object of my invention is to provide novel means for mounting the internal gate in the smoke-pipe on one side of the furnace of breach-pipe, whereby to insure the proper and accurate operation thereof at all times.

With these and other objects in view, the invention consists in the novel construction, arrangement, and formation of parts, as will be hereinafter more specifically described, claimed, and illustrated in the accompanying drawings, in which drawings:

Figure 1 is a side elevational view of a smoke-pipe connecting a heating plant with a stack or chimney, with my novel appliance incorporated therewith, parts of the view being shown broken away and in section to illustrate structural detail.

Figure 2 is a vertical, sectional view taken on the line 2—2 of Figure 1, looking in the direction of the arrows, illustrating the external damper and the operating mechanism therefor.

Figure 3 is an enlarged, detail, horizontal, sectional view taken on the line 3—3 of Figure 1, looking in the direction of the arrows, illustrating the mounting of the electro-magnet in its supporting casing.

Figure 4:
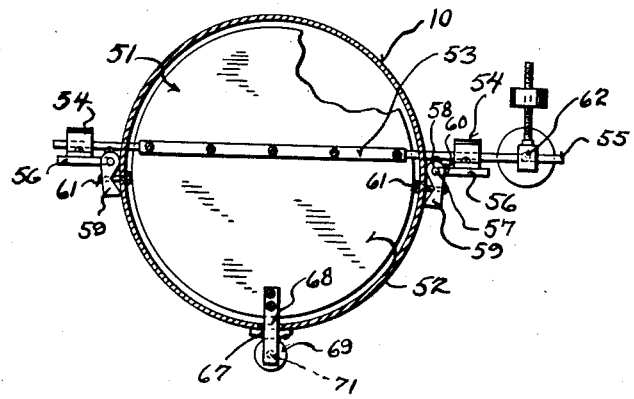
Figure 4 is a detail, vertical, sectional view taken on the line 4—4 of Figure 1, looking in the direction of the arrows, illustrating the internal damper.

Referring to the drawings in detail, wherein similar reference characters designate corresponding parts throughout the several views, the numeral 10 indicates a smoke-pipe leading to a stack or chimney 11. A breach-pipe 12 connects an intermediate part of the smoke-pipe with the heating plant 14. This leaves a part of the smoke-pipe 10 projecting laterally beyond the furnace or breach-pipe 12. The heating plant 14 can be of any desired character and can be stoker-fed or oil-fired.

In accordance with my invention, I arrange an external damper 15 for the smoke-pipe and an internal damper 51 for the smoke-pipe. These dampers 15 and 51 are disposed on opposite sides of the breach-pipe 12, and the arrangement and operation of the dampers relative to one another and to the stack and furnace forms an essential part of my present invention. Each damper will now be described in detail.

The external damper 15 includes an annular damper ring or frame 16, which is securely fastened, as at 17, to the outer end of the smoke-pipe 10. The extreme lower end of the ring or frame has formed thereon a depending foot 18, to which is fastened the bracket 19 for supporting the various operating parts of the damper and the casing 20 for said operating parts.

Rockably mounted within the ring or frame 16 is the damper gate or plate 21. The gate can be formed from sheet metal, if so desired, and the periphery thereof is inturned to provide a reinforcing flange 22. The gate, at a point above its horizontal diametric center, has secured thereto a bearing shaft 23. This shaft can be of any desired configuration in cross section, such as square, and the ends thereof receive the pointed bearing terminals of adjustable bearing pintles 24 carried by the annular damper ring or frame 16.

From the construction so far, it can be seen that the bottom of the damper gate overbalances the upper end of the damper gate, and, hence, the damper gate normally tends to swing to a closed position. However, in order to accurately balance and set the damper gate to suit various drafts, atmospheric pressures, etc., at different stacks and pipes, the gate has adjustably associated therewith, above its horizontal center, certain weights, which will now be described in detail.

Disposed at the vertical center of the damper gate is a weight-supporting rod 25, and the ends of the rod are adjustably secured in blocks 26 firmly bolted to the damper gate. Slidably mounted upon the rod 25 is a weight 27, and this weight is held in its adjusted position by a set screw 28, which can be moved into and out of contact with the rod. By this construction and arrangement, the weight 27 can be moved toward and away from the horizontal center of the damper gate.

Adjustable on the rod 25 between the shaft 23 and the weight 27 is a block 29, and this block is held in an adjusted position by a set screw 30. Extending outwardly from the block 29 is a threaded rod 31, on which is threaded the weight 32. The weight can be held in an adjusted position on the threaded rod by lock nuts 33. By this construction and arrangement, the weight 32 can be moved toward or away from the inner face of the damper gate.

In order to limit the outward swinging of the lower end of the damper gate, a resilient cushion 34 can be secured to the bracket 19 and arranged in the path of the lower end of said gate.

Referring to the operating mechanism for the damper gate, the same includes a solenoid 35 having a movable plunger 36. The solenoid is slidably mounted on a track 37 carried by the depending arm 38 of the bracket 19. Set screws 39 adjustably associated with the depending arm 38 engage the opposite ends of the solenoid and adjustably clamp and hold the solenoid in the correct desired place. An operating lever 40 of the bell-crank order is also rockably mounted on the bracket 19, and the same includes an upper arcuate long arm 41 extending toward the damper gate. The extreme upper end of the arm 41 carries an anti-friction roller 42 for rolling contact with an inclined track 43 rigidly secured to the outer face of the damper gate. The hub of the lever 40 is provided with an arcuate face 44, which constitutes the short arm of the lever, and this arcuate face has secured thereto a flexible pull cable 45. The lower end of the pull cable is firmly attached to the plunger 36 of the solenoid 35. Rigidly secured to the rock shaft 46 of the operating lever for swinging movement with the rock shaft and lever are outwardly extending rods 47, and these rods 47 are connected to the bracket 19 by contractile coil springs 48. The springs 48 normally tend to rock the lever and swing the inner upper end thereof into engagement with the track 43 for rocking the gate on its pivot against the action of gravity on the weights. Obviously, when the solenoid 35 is energized, the lever is pulled away from the damper gate, and, hence, the weights are free to move the damper gate to a closed position, and the damper can actuate automatically under the influence of stack drafts, atmospheric pressure, etc. Rearward swinging movement of the operating lever can be limited by the use of an adjustable rod 49, which is mounted in a slide block 50. This rod 49 can be moved back and forth toward the lever to the desired and correct position.

While I have not shown the solenoid in the motor circuit of a coal stoker or in the motor circuit of an oil burner, it is to be understood that the solenoid can be arranged in the circuits in the same manner as shown in Figure 4 of my mentioned pending application.

Hence, when the circuit to the motor for the feed of coal or oil is closed, the solenoid is energized, and the damper gate will have a tendency to move to its closed position. Thus, when a stoker or oil feed is not in operation, the solenoid is deenergized, and the damper gate is free to swing open to check the draft.

As the operating lever 40 is not connected to the operating damper gate 21, except by contact, the damper gate is under the direct influence of the chimney temperatures or any atmospheric pressures when the said operating lever 40 is drawn back by the downward movement of the solenoid plunger 36. By providing the roller 42, a minimum amount of resistance to the force of the springs 48 is set.

The inclined roller track 43 attached to the damper gate permits the damper gate to open to a greater degree with a progressively accelerated motion without changing the length of the lever travel. This permits the use of a relatively short lever on the operating end, and a longer lever as exists on the plane of the damper gate in respect to the center-to-center distance of the lever roller and the axis of the damper gate. By having the rods 47 adjustable on the rock shaft 46, I have devised a novel method for setting and controlling the spring tension required to open the damper gate at the time the solenoid magnet is deenergized.

As the bracket 19 effectively supports and carries the imperforate casing 20, the solenoid and plunger is protected against moisture and other corrosive elements, and, if desired, an oil dashpot can be employed to enclose the magnet in an oil bath.

As the weights 27 and 32 are independent of one another, the weights can be readily adjusted and set for any desired draft value, and the operation of the weights permits the damper gate to become progressively lighter in weight as it opens in its maximum open range.

Now, referring to the inner damper 51, the same includes a disc-shaped damper plate or gate 52. This gate 52 has firmly secured thereto, above its horizontal diametric center, a rock shaft 53. This rock shaft, at its point of contact with the gate 52, can be of a square shape in cross section, but the ends of the shaft are round and are mounted in roller bearings carried by bearing brackets 54, which are mounted in a novel manner on the smoke-pipe 10, as will be specifically set forth. It is to be noted, however, that one end of the shaft 53 is extended beyond the bearing bracket on one side, as at 55, for a purpose which also will be more fully explained.

The bearing brackets 54 are mounted upon plates 56, and the edges of the plates carry bearing pintles 57, which are rotatably received in bearing ears 58 formed on attaching plates 59.

Set screws 60 are carried by the bearing ears for engaging the bearing pins, whereby to adjustably hold the plates 56 in the desired set position. The inner faces of the bearing plates 59 are notched, and the bearing ears 58 are rounded for engagement with the pipe, and the opposite ends of the bearing plates receive adjustable securing bolts 61. The bolts, on opposite sides of the plates, can be adjusted in and out, so as to secure the proper alinement of the bearing brackets 54.

The extended end 55 of the shaft 53 has adjustably mounted thereon a supporting block 62. This block has radially extending therefrom at quarters, threaded rods 63 and 64. When the gate is in its closed position, the rod 63 is in a substantially horizontal position, while the rod 64 is in a substantially vertical position. The rod 63 has threaded thereon a weight 65, while the rod 64 has threaded thereon a weight 66. These weights 65 and 66 are adjustable on their respective rods toward and away from the supporting block 62. By this arrangement of parts, the accurate balancing and setting of the gate to stack drafts can be accomplished.

The lower end of the smoke-pipe 10 is slotted, as at 67, for the reception of a depending finger 68, which is secured to the lower end of the damper gate. This finger cooperates with means for lessening the shock of the closing of the gate, and the means for cooperating with the finger includes a cylinder 69 firmly bolted to the smoke-pipe. The cylinder 69 has slidably mounted therein a plunger 70 and a plunger rod 71. Spring means 72 normally urges the plunger and plunger rod outwardly, with the plunger rod toward the finger. The opposite ends of the cylinder have formed therein air escape ports, the size of which can be accurately controlled by set screws 73. I lay considerable stress on the means of mounting the internal damper gate, as the bearing brackets can be accurately disposed and brought into proper alinement for receiving the supporting shaft.

By my arrangement of internal and external dampers, I have designed and developed a novel method of controlling the cross-sectional area of any smoke-pipe or bleaching with the use of an atmospherically controlled internal damper gate in direct combination with an externally mounted, motorized, atmospherically operated damper gate. This means that as the vacuum pressure of the bleaching varies with the motion of the external damper gate 21, the internal damper gate 52 is forced to accept either an open or closed position, as the case may be, or any point of its normal travel arc. It further means that the weights on the internal damper gate are set to hold the gate in an open position against the pull of the stack draft, and the weights of the external damper gate are set to open with the pull of the stack.

As the draft increases, the external damper will open, permitting full atmospheric pressure to exert itself on the greater lower half area of the internal damper gate, which seeks to close it against the action of the counterweights. This reduces the draft effect over the fire.

Figure 5:
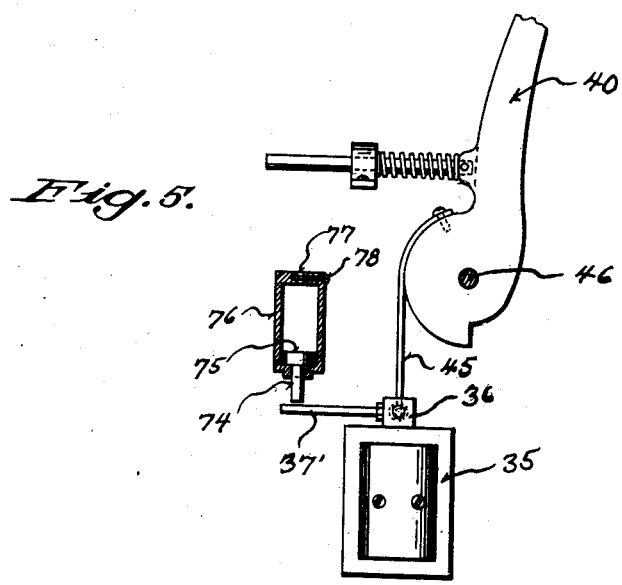
Figure 5 is an enlarged, detail, diagrammatic view illustrating one form of means for delaying the action of the external damper gate.

When the external damper gate is in its open position, the internal damper gate is in its closed position, or it may still shift its position when the static draft of the stack varies, as atmospheric conditions change with the external gate wide open. When the external damper gate is affected by atmospheric changes and seeks a closed position, the internal damper gate will open, which allows a uniform over-fire draft at all times.

Where an oil burner is utilized, it is not desirable to check the draft too rapidly. In Figure 5, I have illustrated a means for delaying the opening of the external gate. A delay of from one to five minutes can be provided, according to the adjustment of the device.

As shown in Figure 5, the plunger 36 of the solenoid 35 carries a laterally extending rod 37', which is adapted to strike a rod 74 of a plunger 75 mounted in a closed cylinder 76. This cylinder 76 has formed therein an air escape port 77, and the size of this port is adjusted by a screw 78. By varying the size of the port 77, the time of the delay of the checking of the draft can be controlled. Upon the deenergizing of the magnet 35, the operating lever 40 and the damper gate tends to rock, and the damper gate tends to swing to an open position. Rocking movement of the lever 40 under the influence of its springs is checked by the movement of the plunger 75 acting against the trapped air in the cylinder 76.

Various changes in details may be made without departing from the spirit of the scope of my invention, but what I claim as new is:

1. In a furnace control, a smoke-pipe, an annular frame in the smoke-pipe, a damper gate, means rockably supporting the damper gate in the frame above its horizontal diametric center, a bracket secured to the frame, an operating lever having a long arm and a short arm rockably mounted upon the bracket, a solenoid including a plunger connected to the lever, means operatively connecting the plunger to the short arm of the lever, an anti-friction roller on the outer end of the long arm of the lever, and an inclined track on the damper gate adapted to be engaged by the roller.

2. In a furnace control, a smoke-pipe, a damper gate rockably mounted above its horizontal diametric center in said smoke-pipe, weights normally tending to move the gate to a closed position, a movable lever engaging the gate below its pivot, spring means acting on the lever for moving the lever against the gate to open the same, means for actuating the lever against the tension of said spring means, and means for delaying the return movement of the lever with the tension of said spring means after actuation of the lever.

WELTON E. FIREHAMMER.